March 26, 1929.  G. W. BORG  1,706,435
CLUTCH
Filed Sept. 22, 1924
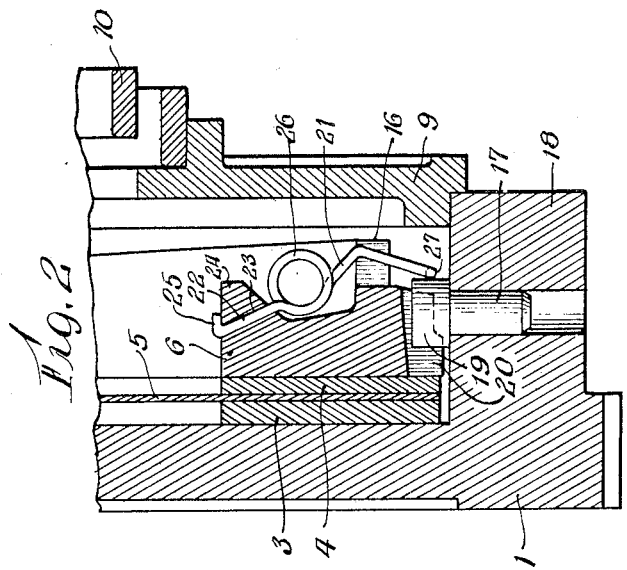
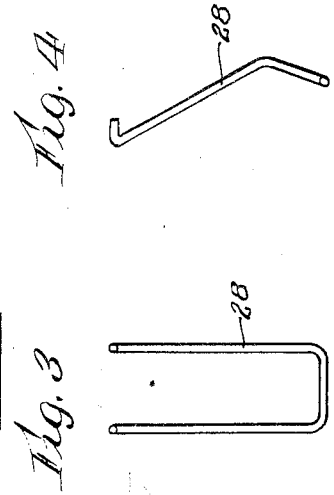
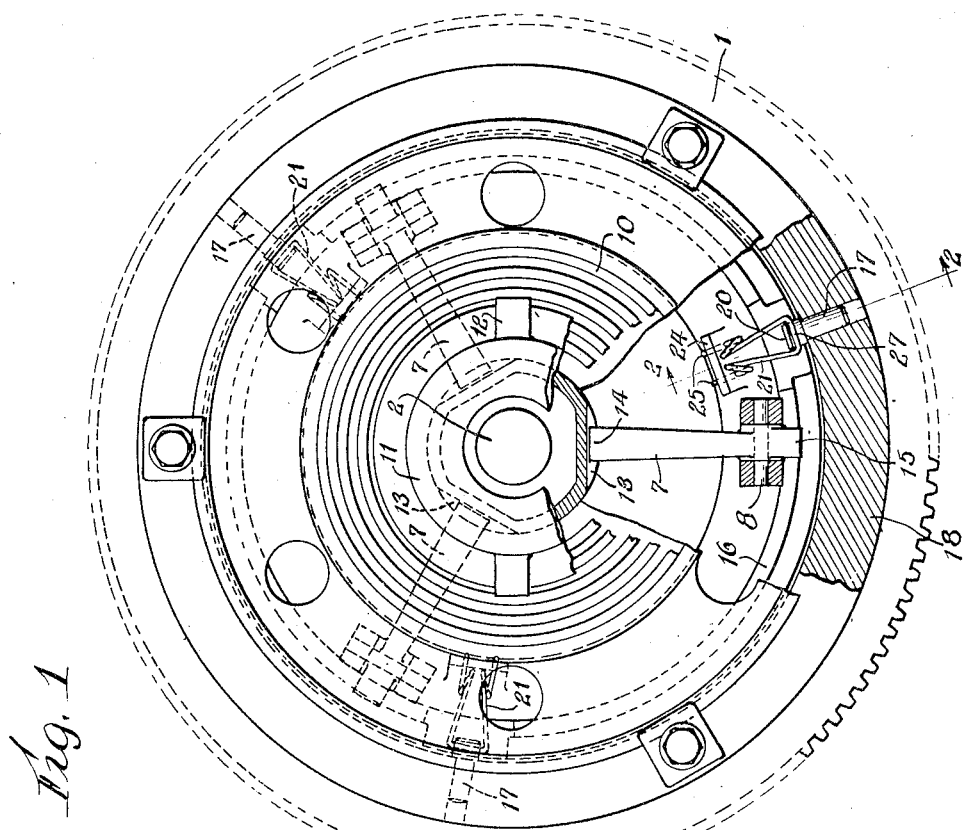
Inventor:
George W. Borg
By: Wm. O. Belt, Atty.

Patented Mar. 26, 1929.

1,706,435

UNITED STATES PATENT OFFICE.

GEORGE W. BORG, OF CHICAGO, ILLINOIS, ASSIGNOR TO THE BORG & BECK COMPANY, OF CHICAGO, ILLINOIS, A CORPORATION OF ILLINOIS.

CLUTCH.

Application filed September 22, 1924. Serial No. 738,996.

This invention relates to an improvement in clutches and has for its principal object to eliminate the wear and noise caused by play between certain parts of a clutch.

A further object is to provide means which shall insure a positive release of the driving connection of a clutch.

In the accompanying drawings in which I have shown a selected embodiment of my invention, Fig. 1 is an elevation partly in section of a clutch having my invention applied thereto.

Fig. 2 is a section on the line 2—2 of Fig. 1.

Fig. 3 is an elevation of a modified form of spring which may be used with my invention, and Fig. 4 is an elevation of the modified form taken at right angles to that of Fig. 3.

Referring now to the drawings, the numeral 1 designates a flywheel secured to a driving shaft (not shown) and which through the clutch, is adapted to drive the driven shaft 2 coaxially with the driving shaft. The details of the clutch will not be described herein any more than is necessary to bring out the novel features of this invention as said details form the subject-matter of Letters Patent No. 1,623,470, patented April 5, 1927. It will suffice to say that the clutch is a friction clutch operated by means of the friction rings 3 and 4 carried by the friction disk 5 and contacting respectively with the flywheel 1 and thrust ring 6. The friction disk 5 is splined to the driven shaft 2 and capable of longitudinal movement thereon. This longitudinal movement is supplied by levers 7 pivoted at 8 on a cover plate 9 and controlled by a spiral spring 10 compressed between the plate 9 and a collar 11 slidably mounted on the shaft 2. This collar 11 is provided with means 12 whereby it may be operated by an ordinary clutch lever and is further provided with a plurality of grooves 13 in which rest the ends 14 of the levers 7. The other ends 15 of said levers 7 contact with the cam surface 16 of the thrust ring 6.

It will thus be seen that the spring 10 urges the thrust ring 6 into engagement with the friction ring 4, thereby forcing the friction ring 3 into engagement with the face of the flywheel 1 and thus causing a frictional driving connection between the driving and driven shafts, it being remembered that the friction disk 5 is splined to the driven shaft and the flywheel is fast on the driving shaft. The frictional driving connection just described is controlled by movement of the collar 11 as is well-known in the art.

Adjustment to take up wear is made by rotatably adjusting the cover plate 9 to bring the ends 15 of the levers 7 into engagement with different portions of the cam surface 16 of the thrust ring.

The thrust ring is held in position to rotate with the flywheel 1 but is capable of movement with respect thereto parallel to the axis of the driving and driven shafts, and means for so connecting them is exemplified by a plurality of pins 17 carried in the flange 18 of the flywheel and each having a head 19 projecting within said flange where it is received within a slot 20 in the thrust ring.

In the use of the clutch as above described, it has been found that there is a certain amount of wabbling of the thrust ring on the pins, resulting in wear and its attendant noise because of the fact that the surface 16 of the thrust ring was not always maintained in engagement with the ends 15 of the levers 7, particularly after actuation of the clutch lever to release the clutch. The result was that the driving connection between the driving and driven elements 1 and 5, respectively, was not positively released upon actuation of the clutch lever for that purpose, but was released by the ring wabbling on the pins till finally stopped by contact with the levers. To obviate these troubles I have provided a yielding means exemplified by a spring 21 acting against the spring 10, which may take the form shown in Figs. 1 and 2, and this spring is preferably of a U form having a pair of legs 22 passing through apertures 23 in a lug 24 formed on the thrust ring adjacent each pin 17. The upper ends of these legs may be bent over, as shown at 25, in order to insure retention thereof in the apertures 23. In this embodiment the spring is provided with a coil 26 in each of the legs 22 to increase the force exerted by the spring. The base 27 of the U bears against the outer portion of the head 19 of the pin whereby the thrust ring will tend to be forced towards the right in Fig. 2 or against the ends 15 of the levers and away from the friction ring 5, following the movement of the levers 7 at all times, and insuring a release of the driving connection between the elements 1 and 5, by causing the ring 6 to move in unison with the levers. The result is that the controlling means for the driving connection is always in operative condition.

Referring to Figs. 3 and 4, I have shown therein a modified form of spring 28 performing the same function as the spring 21 and similar thereto in all respects except that the coil 26 is omitted. This type of spring may be used instead of the spring 21 employing the coil, if so desired.

I am aware that changes in the form, construction and arrangement of parts may be made without departing from the spirit and without sacrificing the advantages of the invention and I reserve the right to make all such changes as fairly fall within the scope of the following claim.

I claim:

In a friction clutch comprising a fly wheel adapted to be secured to a driving shaft and having a peripheral flange, a plurality of pins radially disposed in said flange, a friction disk, a thrust ring, and controlling means comprising a plurality of levers, and a spring operating the levers to engage and operate the thrust ring to clamp the disk against the fly wheel, of a lug disposed on the thrust ring opposite each of said pins, each of said lugs being provided with apertures, and wire springs, generally U-shaped, each having its ends engaged with said apertures and the bight portion operatively engaged with a pin whereby to release the thrust ring from operative engagement with the disk when the levers are released from operative engagement with the thrust ring.

GEORGE W. BORG.